United States Patent
Fujiwara

(10) Patent No.: US 9,227,590 B2
(45) Date of Patent: Jan. 5, 2016

(54) VEHICLE SIDE AIRBAG DEVICE

(75) Inventor: Yusuke Fujiwara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/423,755

(22) PCT Filed: Aug. 27, 2012

(86) PCT No.: PCT/JP2012/071618
§ 371 (c)(1),
(2), (4) Date: Feb. 25, 2015

(87) PCT Pub. No.: WO2014/033820
PCT Pub. Date: Mar. 6, 2014

(65) Prior Publication Data
US 2015/0217714 A1    Aug. 6, 2015

(51) Int. Cl.
| | |
|---|---|
| *B60R 21/16* | (2006.01) |
| *B60R 21/235* | (2006.01) |
| *B60R 21/231* | (2011.01) |
| *B60R 21/2338* | (2011.01) |
| *B60R 21/207* | (2006.01) |
| *B60R 21/216* | (2011.01) |
| *B60R 21/233* | (2006.01) |

(52) U.S. Cl.
CPC ............. *B60R 21/235* (2013.01); *B60R 21/207* (2013.01); *B60R 21/216* (2013.01); *B60R 21/233* (2013.01); *B60R 21/2338* (2013.01); *B60R 21/23138* (2013.01); *B60R 2021/23146* (2013.01); *B60R 2021/23324* (2013.01); *B60R 2021/23382* (2013.01); *B60R 2021/23509* (2013.01)

(58) Field of Classification Search
USPC .................................. 280/730.2, 743.1, 743.2
See application file for complete search history.

(56) References Cited

U.S. PATENT DOCUMENTS

| | | | |
|---|---|---|---|
| 5,730,464 A | 3/1998 | Hill | |
| 6,062,594 A * | 5/2000 | Asano | B60R 21/23138 280/729 |
| 6,231,072 B1 * | 5/2001 | Pywell | B60R 21/02 280/730.2 |
| 6,478,329 B1 * | 11/2002 | Yokoyama | B60R 21/23138 280/729 |
| 7,431,329 B2 * | 10/2008 | Taguchi | B60R 21/23138 280/729 |
| 7,828,322 B2 * | 11/2010 | Breuninger | B60R 21/231 280/730.2 |
| 8,322,747 B2 * | 12/2012 | Shankar | B60R 21/23138 280/729 |

(Continued)

FOREIGN PATENT DOCUMENTS

| | | |
|---|---|---|
| JP | 2006-137413 A | 6/2006 |
| JP | 2006-206049 A | 8/2006 |

(Continued)

*Primary Examiner* — Toan To
(74) *Attorney, Agent, or Firm* — Oliff PLC

(57) ABSTRACT

In a vehicle side airbag device, when a side airbag is inflated and deployed, a tension cloth disposed bridging an upper side bag portion and a lower side bag portion on the vehicle width direction outer side of the side airbag is pulled up and down. The vehicle width direction inflation width of the side airbag is enlarged, so the vehicle width direction shock absorbing stroke can be ensured by the small-capacity side airbag. The tension cloth functions as a reaction force surface that supports the upper side bag portion from the outer side in the vehicle width direction, so even in a vehicle in which the position of a door beltline is low, a shoulder of an occupant can be restrained at an early stage. In a case where the vehicle has rolled over, the tension cloth protects the side airbag from fragments of a door glass.

7 Claims, 13 Drawing Sheets

(56) References Cited

U.S. PATENT DOCUMENTS

| | | | |
|---|---|---|---|
| 8,567,817 B2* | 10/2013 | Yamamoto | B60R 21/23138 280/729 |
| 8,616,579 B2* | 12/2013 | Suzuki | B60R 21/23138 280/729 |
| 8,727,375 B2* | 5/2014 | Suzuki | B60R 21/233 280/730.2 |
| 9,016,718 B2* | 4/2015 | Fukawatase | B60R 21/233 280/730.2 |
| 2003/0132617 A1 | 7/2003 | Takimoto et al. | |
| 2005/0206138 A1 | 9/2005 | Breuninger et al. | |
| 2006/0131847 A1* | 6/2006 | Sato | B60R 21/207 280/730.2 |
| 2008/0185824 A1* | 8/2008 | Sato | B60R 21/23138 280/730.2 |
| 2010/0276915 A1 | 11/2010 | Breuninger et al. | |
| 2010/0276916 A1 | 11/2010 | Breuninger et al. | |
| 2011/0012330 A1 | 1/2011 | Sato et al. | |
| 2012/0049498 A1 | 3/2012 | Wiik et al. | |

FOREIGN PATENT DOCUMENTS

| | | |
|---|---|---|
| JP | 2009-137536 A | 6/2009 |
| JP | 2010-132072 A | 6/2010 |
| JP | 2011-020502 A | 2/2011 |
| JP | 2012-051557 A | 3/2012 |
| WO | 97/06987 A1 | 2/1997 |

* cited by examiner

VEHICLE SIDE AIRBAG DEVICE

TECHNICAL FIELD

The present invention relates to a vehicle side airbag device.

BACKGROUND ART

In the vehicle side airbag device described in patent document 1 cited below, a side airbag is equipped with a rear side tube bag portion, which extends in an up and down direction on the vehicle rear side of a vehicle width direction outer side end of a chest of an occupant when the side airbag is inflated and deployed, and a front side tube bag portion, which is positioned on the vehicle front side of the vehicle width direction outer side end of the chest of the occupant on the vehicle front side of the rear side tube bag portion and extends in the up and down direction. The upper portion of the rear side tube bag portion is a shoulder restraining portion that is positioned to the side of the shoulder of the occupant and restrains the shoulder, and the upper edge of the front side tube bag portion is an arm support portion that is located in a position lower than the armpit of the occupant on the vehicle front side of the shoulder restraining portion and on which the upper arm of the occupant becomes placed.

That is, in this vehicle side airbag device, the shoulder of the occupant whose load resistance is relatively high is restrained by the shoulder restraining portion, and the upper arm of the occupant becomes placed on the arm support portion, so that the upper arm is kept from coming between the chest of the occupant whose load resistance is relatively low and the airbag.

CITATION LIST

Patent Literature

Patent Document 1: Japanese Patent Application Laid-open (JP-A) No. 2010-132072

SUMMARY OF INVENTION

Technical Problem

The side airbag described above has a large capacity, so the speed with which the side airbag is inflated and deployed tends to be slow, and there is room for improvement in terms of improving its initial restraint performance. Particularly in a vehicle in which the door beltline of the side door is low, the space between the shoulder of the occupant and the vehicle body side portion (the door glass of the side door) is wide, so it is difficult to apply, at an early stage, the reaction force from the vehicle body side portion to the shoulder restraining portion of the side airbag that has been inflated and deployed in that space. As a result, it is conceivable for the restraint of the shoulder of the occupant to be slow and for the load on the chest of the occupant to increase.

In consideration of these circumstances, it is an object of the present invention to obtain a vehicle side airbag device that can improve the ability of the side airbag to initially restrain the shoulder of the occupant.

Solution to Problem

A vehicle side airbag device of a first aspect of the present invention comprises: an inflator that generates a gas upon activation; a side airbag that has two bag portions partitioned from one another by a partition portion, the side airbag being inflated and deployed, when the gas is supplied to an inner side of the side airbag, toward a vehicle front side from a side portion of a vehicle width direction outer side of a seat back of a vehicle seat, the two bag portions being adjacent to one another along a vehicle body side portion, and the side airbag restraining at least a shoulder, a chest and an abdomen of an occupant seated in the vehicle seat; and a tension cloth that is disposed bridging the two bag portions on a vehicle width direction outer side of the side airbag in an inflated and deployed state of the side airbag, that is pulled between the two bag portions, and that controls inflation of the side airbag in the direction in which the tension cloth is pulled to enlarge a vehicle width direction inflation width of the side airbag, wherein in the inflated and deployed state of the side airbag, the two bag portions are vertically adjacent to one another, and the tension cloth is pulled between a section, at an upper side of a center of the shoulder, of the bag portion disposed on an upper side that restrains the shoulder and the bag portion disposed on a lower side.

The size of the side airbag is set using a worldwide harmonized side impact dummy (World Side Impact Dummy: WorldSID), for example.

In the first aspect, when, for example, a side impact to or a rollover of the vehicle is detected, the inflator is activated, the gas is generated, and the gas is supplied to the inner side of the side airbag. Because of this, the side airbag becomes inflated and deployed toward the vehicle front side from the side portion of the vehicle width direction outer side of the seat back of the vehicle seat, and at least the shoulder, the chest, and the abdomen of the occupant seated in the vehicle seat are restrained by the side airbag.

Here, in the inflated and deployed state of the side airbag, the two bag portions with which the side airbag is equipped are adjacent to one another along the vehicle body side portion, and the tension cloth disposed bridging the two bag portions on the vehicle width direction outer side of the side airbag is pulled between the two bag portions. As a result, inflation of the side airbag in the direction in which the tension cloth is pulled is controlled, and the vehicle width direction inflation width of the side airbag is enlarged. Because of this, the vehicle width direction shock absorbing stroke can be ensured by the small-capacity side airbag. In other words, the capacity of the side airbag can be reduced without having to reduce the shock absorbing stroke, so it becomes possible to inflate and deploy the side airbag at an early stage.

Moreover, because the vehicle width direction inflation width is enlarged as described above, even in a case where the space between the shoulder of the occupant and the vehicle body side portion is wide, it becomes possible to apply, at an early stage, the reaction force from the vehicle body side portion to the shoulder restraining portion of the side airbag that has been inflated and deployed in that space. As a result, the ability of the side airbag to initially restrain the shoulder of the occupant can be improved.

Moreover, in the present aspect, the tension cloth is positioned on the vehicle width direction outer side of the inflated and deployed side airbag, so even in a case where the vehicle has rolled over, the tension cloth can protect the side airbag from fragments of the door glass of the side door.

The position of the "center of the shoulder" in the present aspect is, for example, the position of the center (axial center) of a bolt disposed in the shoulder of a worldwide harmonized side impact dummy seated in the vehicle seat.

Further, in the present aspect, when the side airbag is inflated and deployed, the two bag portions are vertically adjacent to one another, and the tension cloth positioned on the vehicle width direction outer side of the side airbag is pulled between the section, at the upper side of the center of the shoulder, of the bag portion disposed on the upper side and the bag portion disposed on the lower side. As a result, the tension cloth functions as a reaction force surface that supports, from the outer side in the vehicle width direction, the bag portion disposed on the upper side that restrains the shoulder of the occupant. Because of this, the ability of the bag portion disposed on the upper side to initially restrain the shoulder of the occupant can be improved.

Moreover, because the tension cloth is positioned on the vehicle width direction outer side of the side airbag, the side airbag is inflated and deployed in such a way that the up and down direction middle portion of the side airbag projects inward in the vehicle width direction while the side airbag bends slightly along the partition portion between the upper and lower bag portions in such a way that the partition portion is displaced inward in the vehicle width direction. Because of this, the vehicle width direction inner side surface of the bag portion disposed on the upper side slants or curves in such a way as to rise as it heads outward in the vehicle width direction. For this reason, the side airbag and the occupant relatively move closer to one another because of the shock of the side impact, so that the upper arm of the occupant can be allowed to make sliding contact with and slide upward on the slanted or curved surface. Because of this, the upper arm can be kept from coming between the chest of the occupant and the side airbag, so the load on the chest can be effectively reduced.

A vehicle side airbag device of a third aspect of the present invention is the first aspect, wherein in the inflated and deployed state of the side airbag, the tension cloth is deployed vertically straddling a door beltline of a side door disposed in the vehicle body side portion.

In the third aspect, when the side airbag is inflated and deployed, the tension cloth positioned on the vehicle width direction outer side of the side airbag is deployed vertically straddling the door beltline of the side door. Additionally, the tension cloth is pulled between the section, at the upper side of the center of the shoulder, of the bag portion disposed on the upper side and the bag portion disposed on the lower side and functions as a reaction force surface of the upper side bag portion. Because of this, even in a case where the reaction force from the door trim of the side door, for example, cannot be allowed to directly act on the section of the bag portion disposed on the upper side positioned on the upper side of the door beltline, the bag portion disposed on the upper side can be excellently supported from the outer side in the vehicle width direction by the reaction force from the tension cloth. Because of this, even in a case where the position of the door beltline is low, the ability of the side airbag to initially restrain the shoulder of the occupant can be improved.

A vehicle side airbag device of a fourth aspect is the first or third aspect, wherein the vehicle seat is a driver's seat, and the partition portion is set in such a way as to extend obliquely downward in a vehicle front direction, along an upper arm of the occupant seated in the driver's seat, on a lower side of the upper arm in the inflated and deployed state of the side airbag.

In the fourth aspect, the upper arm of the occupant is assumed to be inclined in such a way as to extend obliquely downward in the vehicle front direction. Additionally, the angle of inclination of the upper arm is an angle of inclination defined in a side impact test using a worldwide harmonized side impact dummy, for example.

In the fourth aspect, the partition portion extends as described above in the inflated and deployed state of the side airbag, so the vehicle width direction inner side surface of the bag portion disposed on the upper side—that is, the surface that slants or curves in such a way as to rise as it heads outward in the vehicle width direction—and the lengthwise direction center portion of the upper arm of the occupant (near the center of gravity of the upper arm) can be excellently brought into contact with one another. Because of this, the upward pushing force that acts on the upper arm because of the sliding contact with the slanted or curved surface can be excellently allowed to act near the center of gravity of the upper arm. As a result, it becomes possible to effectively push up the upper arm.

A vehicle side airbag device of a sixth aspect of the present invention is any one of the first, third or fourth aspects, wherein the tension cloth is formed from a cloth material separate from base cloths configuring the side airbag and is sewn to the side airbag on a side airbag outer periphery outer side of an outer peripheral seam disposed in an outer peripheral portion of the side airbag.

In the sixth aspect, the tension cloth is sewn to the side airbag on the outer periphery outer side of the outer peripheral seam of the side airbag, so gas leakage from the seam for sewing the tension cloth to the side airbag can be prevented.

A vehicle side airbag device of a seventh aspect of the present invention is any one of the first, third and fourth aspects, wherein part of the side airbag is configured by part of the tension cloth.

In the seventh aspect, the side airbag is configured as described above, so the quantity of the base cloths configuring the side airbag can be reduced. As a result, weight and costs can be reduced.

A vehicle side airbag device of an eighth aspect is the sixth or seventh aspect, wherein the tension cloth is configured by a cloth material that is more difficult to stretch than base cloths configuring the side airbag.

In the eighth aspect, the side airbag is configured as described above, so inflation and deployment of the side airbag in the direction in which the tension cloth is pulled can be excellently controlled, and the vehicle width direction inflation width of the side airbag can be excellently enlarged.

Advantageous Effects of Invention

As described above, in the vehicle side airbag device pertaining to the present invention, the ability of the side airbag to initially restrain the shoulder of the occupant can be improved.

DESCRIPTION OF EMBODIMENTS

First Embodiment

Figure 1:
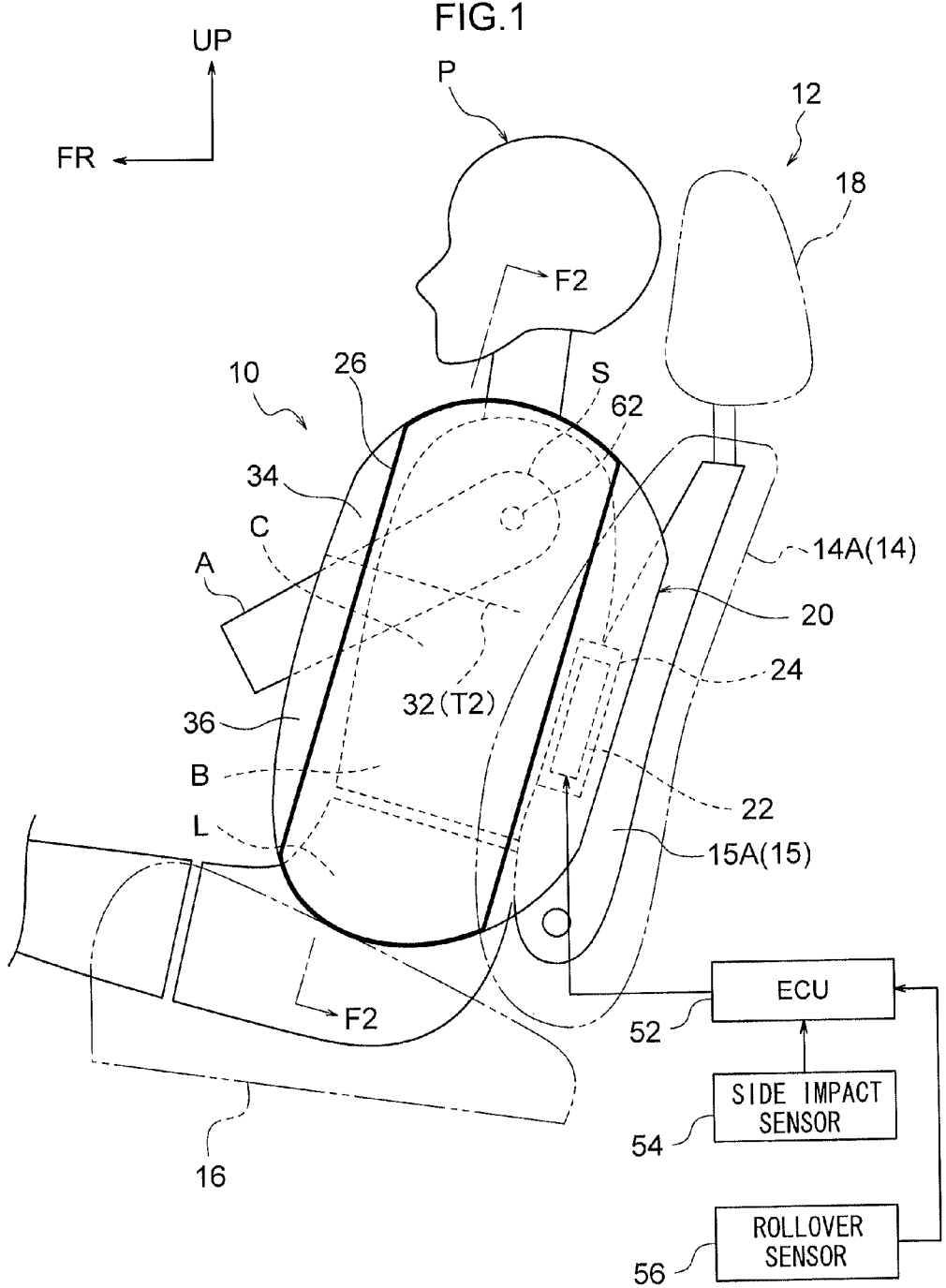
FIG. 1 is a side view of a vehicle seat in which a vehicle side airbag device pertaining to a first embodiment of the present invention is installed, and is a drawing of a state in which a side airbag has been inflated and deployed.

A vehicle side airbag device 10 pertaining to a first embodiment of the present invention will be described on the basis of FIG. 1 to FIG. 6. Arrow FR, arrow UP, and arrow OUT appropriately shown in the drawings indicate a frontward direction (traveling direction) of a vehicle, an upward direction, and outward in a vehicle width direction, respectively. Unless otherwise specified, when description is given simply using the directions of front and rear and up and down, these will mean front and rear in the vehicle front and rear direction and up and down in the vehicle up and down direction.

(Configuration)

As shown in FIG. 1, the side airbag device 10 pertaining to the first embodiment is installed in a door-side side portion 14A (the side portion on a side door 46 side shown in FIG. 2) of a seat back 14 of a vehicle seat 12 (here, a driver's seat). The seat back 14 is tiltably coupled to the rear end portion of a seat cushion 16, and a head rest 18 is coupled to the upper end portion of the seat back 14.

In the present embodiment, the front and rear direction, the right and left direction (the width direction), and the up and down direction of the vehicle seat 12 coincide with the front and rear direction, the right and left direction (the width direction), and the up and down direction of the vehicle, respectively. Furthermore, in FIG. 1 and FIG. 2, a side impact test dummy P is seated in the vehicle seat 12 instead of an actual occupant. The dummy P is, for example, a worldwide harmonized side impact dummy (World Side Impact Dummy: WorldSID), and an upper arm A of the dummy P is inclined in such a way as to extend obliquely downward in the vehicle front direction. The angle of inclination of the upper arm A is an angle of inclination defined in a side impact test using a worldwide harmonized side impact dummy, for example. Hereinafter, in order to make the description easier to understand, the dummy P will be called "the occupant P".

The side airbag device 10 is configured taking as its main components a side airbag 20, an inflator 22 (gas generating means) that generates a gas inside the side airbag 20, a diffuser 24 (a diffusing member) that diffuses the gas generated from the inflator 22, and a tension cloth 26 (a coupling cloth) that is attached to the side airbag 20. Each constituent member will be described below.

The side airbag 20 is disposed (stored) inside the door-side side portion 14A in a state in which the side airbag 20 is folded up together with the tension cloth 26 and modularized (unitized) with the inflator 22 and the diffuser 26. The side airbag 20 is inflated and deployed between the occupant P and the side door 46 by the pressure of the gas generated from the inflator 22 (the states shown in FIG. 1 and FIG. 2). During this inflation and deployment, a seat back pad and a seat cover (neither of which are shown in the drawings) disposed in the door-side side portion 14A are ruptured by the inflation pressure of the side airbag 20. Unless otherwise specified, the front, rear, up, and down directions of the side airbag 20 appearing in the following description indicate directions in a state in which the side airbag 20 is inflated and deployed and substantially coincide with the front, rear, up, and down directions of the seat back 14.

Figure 2:
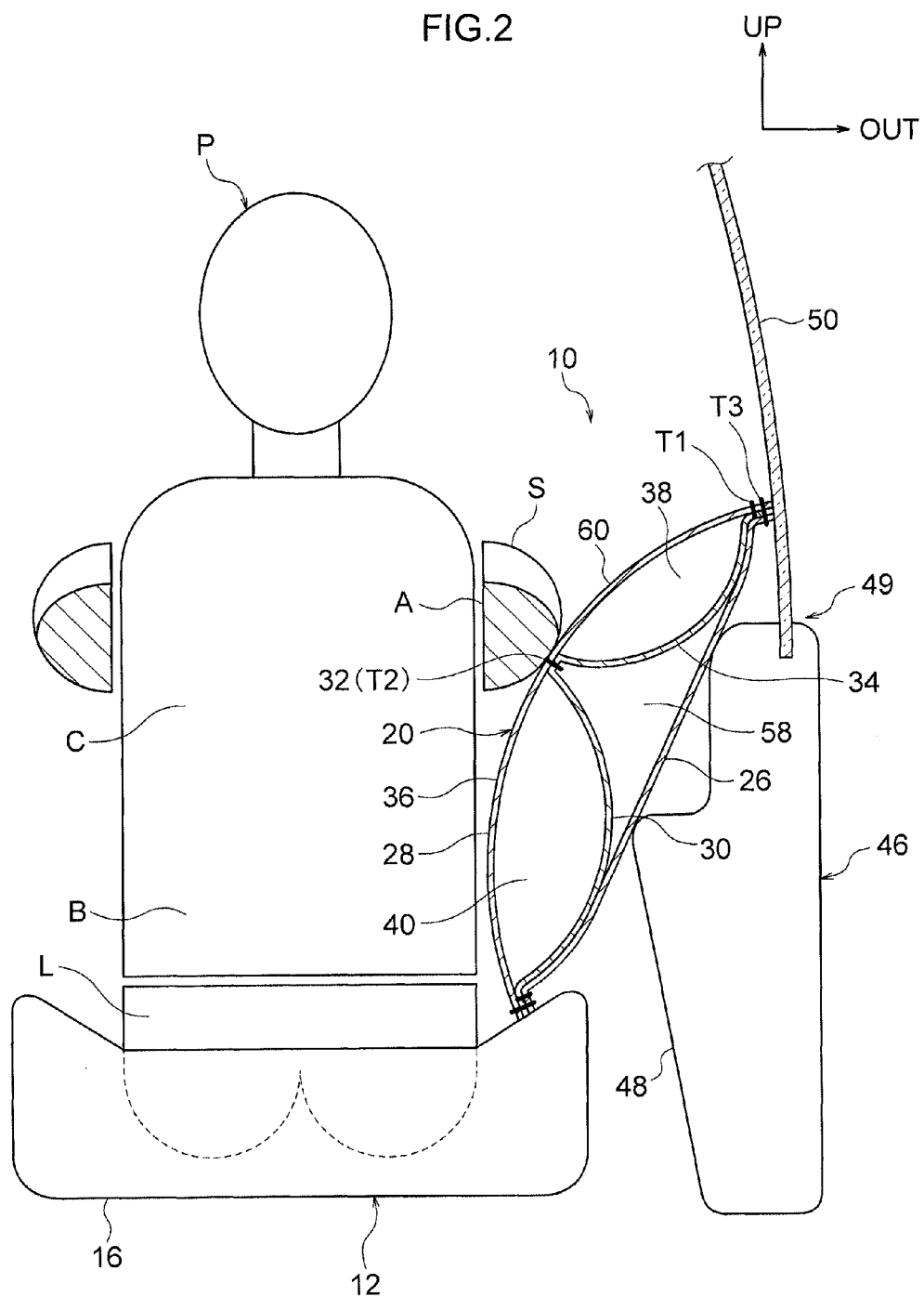
FIG. 2 is a cross-sectional view showing a cross section along line F2-F2 of FIG. 1.
Figure 3:
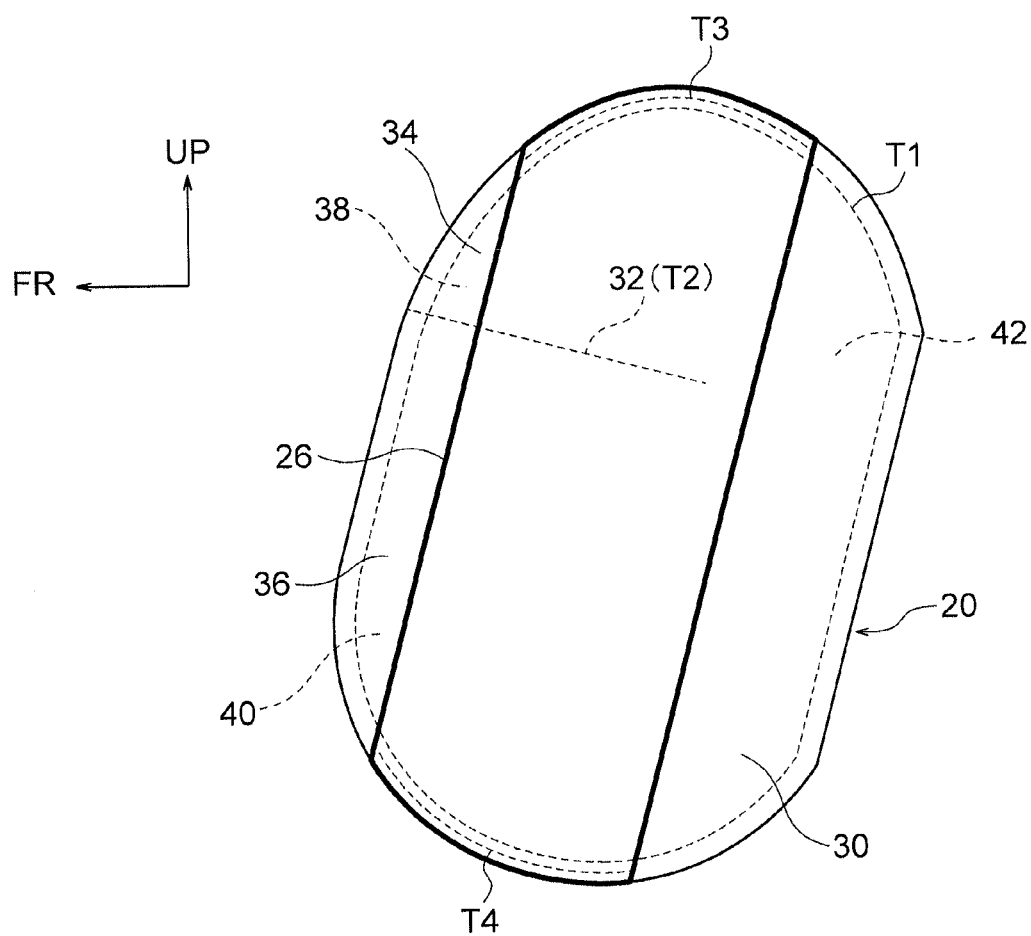
FIG. 3 is a side view showing the inflated and deployed state of the same side airbag.

As shown in FIG. 1 to FIG. 3, the side airbag 20 is a so-called twin-chamber side airbag and is formed in a bag shape as a result of two base cloths 28 and 30, which are formed as a result of being cut out from nylon or polyester cloth material, for example, being laid on top of one another and their outer peripheral edge portions being sewn together at an outer peripheral seam T1 (not shown in FIG. 1). The side airbag 20 may also be formed as a result of one base cloth being folded in two and its outer peripheral edge portion being sewn, and so the method of manufacturing the side airbag 20 can be appropriately changed. For example, the side airbag may also be formed by a double-weave method (the so-called OPW method) resulting from an automatic loom. Furthermore, in FIG. 3, in order to make the drawing easier to see, the outer peripheral seam T1 is depicted as being a single-stitched seam, but the outer peripheral seam T2 is preferably a double-stitched seam.

The side airbag 20 is disposed in such a way that, in the inflated and deployed state, the base cloth 28 faces inward in the vehicle width direction (the occupant P side) and the base cloth 30 faces outward in the vehicle width direction (the side door 46 side). Furthermore, the side airbag 20 is formed in such a way as to have a substantially elliptical shape that is long along the height direction of the seat back 14 in a case where the inflated and deployed state is seen in a side view as shown in FIG. 1 and FIG. 3, and the side airbag 20 is formed in a size capable of restraining a shoulder S, a chest C, an abdomen B, and a lower back L of the occupant P. The size of the side airbag 20 is not limited to what is described above, and it suffices for the side airbag 20 to be of a size capable of restraining at least the shoulder S, the chest C, and the abdomen B of the occupant P.

On the upper portion side of the up and down direction middle portion of the side airbag 20, there is disposed a partition portion 32 that extends from the front end edge of the side airbag 20 toward the rear end edge side of the side airbag 20. In the present embodiment, the partition portion 32 is configured by a seam T2 at which the base cloths 28 and 30 are sewn together. Because of the partition portion 32, the side airbag 20 is partitioned into a bag portion 34 on the upper side (hereinafter called "the upper side bag portion 34") and a bag portion 36 on the lower side (hereinafter called "the lower side bag portion 36"). The inner side of the upper side bag portion 34 is an upper side chamber 38, and the inner side of the lower side bag portion 36 is a lower side chamber 40. The upper side chamber 38 and the lower side chamber 40 are demarcated by the partition portion 32. However, the partition portion 32 does not reach as far as the rear end edge of the side airbag 20, and a communicating opening 42 that communicates the upper side chamber 38 and the lower side chamber 40 is disposed in the rear portion of the side airbag 20.

In a state in which the side airbag 20 having the configuration described above is inflated and deployed, the partition portion 32 extends frontward of the seat back 14 from the lower neighborhood of the armpit of the occupant P, and the upper side bag portion 34 and the lower side bag portion 36 are vertically adjacent to one another along the side door 46 (a vehicle body side portion). Additionally, the upper side bag portion 34 opposes the shoulder S of the occupant P, and the lower side bag portion 36 opposes the chest C, the abdomen B, and the lower back L of the occupant.

As shown in FIG. 1, the inflator 22 is a so-called cylinder type inflator and is housed on the rear end portion side of the inner side of the side airbag 20 together with the diffuser 24, which is formed in a cylindrical shape. The inflator 22 is coaxially housed on the inner side of the diffuser 24 and is fixed to the diffuser 24 as a result of part of the diffuser 24 being swaged. As shown in FIG. 1, the inflator 22 and the diffuser 24 are disposed in a state in which their axial direction is along the height direction of the seat back 14.

An upper and lower pair of stud bolts (not shown in the drawings) project inward in the vehicle width direction from the outer peripheral portion of the diffuser 24. The stud bolts penetrate the base cloth 28 of the side airbag 20 and a side frame 15A of a seat back frame 15, and nuts not shown in the drawings are screwed onto the distal end sides of the stud bolts. Because of this, the diffuser 24 is fastened and fixed to the side frame 15A together with the side airbag 20.

An ECU 52 installed in the vehicle is electrically connected to the inflator 22. A side impact sensor 54 that detects a side impact to the vehicle and a rollover sensor 56 that detects a rollover of the vehicle are electrically connected to the ECU 52. The ECU 52, the side impact sensor 54, and the rollover sensor 56 are constituent members of the side airbag device 10.

The ECU 52 activates the inflator 22 when the ECU 52 has detected (the unavoidability of) a side impact to the vehicle on the basis of a signal from the side impact sensor 54 and when the ECU 52 has detected a rollover of the vehicle on the basis of a signal from the rollover sensor 56. In a case where a pre-crash sensor that predicts (forecasts) a side impact is electrically connected to the ECU 52, the inflator 22 may also be activated when the ECU 52 has predicted a side impact on the basis of a signal from the pre-crash sensor.

When the inflator 22 is activated, gas is discharged from a gas discharge opening disposed in the upper end portion or the lower end portion of the inflator 22. The discharged gas is discharged upward from an open portion in the upper end of the diffuser 24 and supplied via the communicating opening 42 to the upper side chamber 38 and is discharged downward from an open portion in the lower end of the diffuser 24 and supplied to the lower side chamber 40. Because of this, the side airbag 20 is inflated and deployed between the occupant P and a door trim 48 of the side door 46. In FIG. 2, the side door 46 is schematically depicted.

The tension cloth 26 is formed in a long shape by a cloth material separate from the base cloths 28 and 30 configuring the side airbag 20. The cloth material that is the material of the tension cloth 26 is a cloth material that is harder to stretch than the base cloths 28 and 30. The tension cloth 26 is disposed on the opposite side of the base cloth 28 via the base cloth 30 in a state in which the lengthwise direction of the tension cloth 26 is orthogonal or substantially orthogonal to the extension direction of the partition portion 32 and in which the tension cloth 26 straddles the partition portion 32. In other words, the tension cloth 26 is disposed in such a way as to be positioned on the vehicle width direction outer side of the side airbag 20 in the inflated and deployed state of the side airbag 20.

One lengthwise direction end portion (the front end portion) of the tension cloth 26 is sewn to the upper end edge portion of the side airbag 20 at a seam T3. Furthermore, the other lengthwise direction end portion (the rear end portion) of the tension cloth 26 is sewn to the lower end edge portion of the side airbag 20 at a seam T4. Because of this, the tension cloth 26 is disposed bridging the upper end portion of the upper side bag portion 34 and the lower end portion of the lower side bag portion 36, so that the upper end portion of the upper side bag portion 34 and the lower end portion of the lower side bag portion 36 are coupled to one another by the tension cloth 26.

Figure 4:
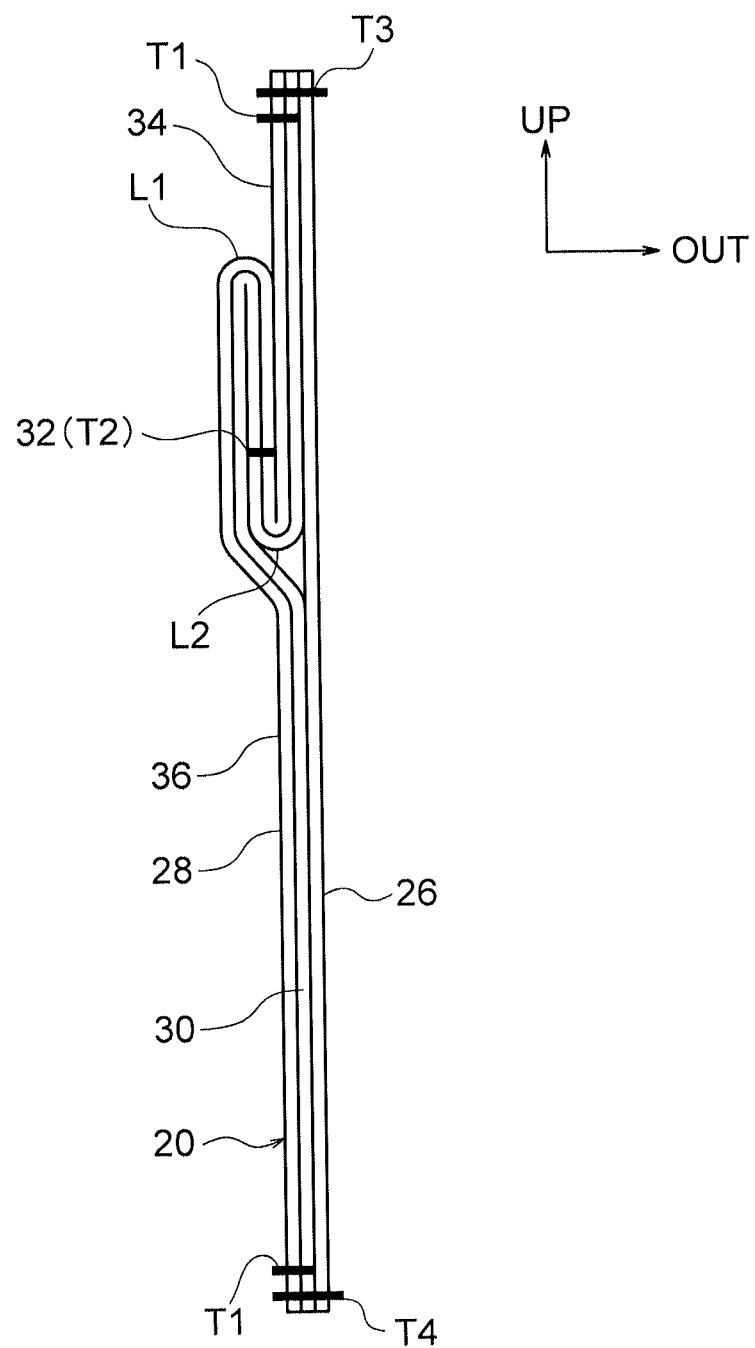
FIG. 4 is a drawing for describing a situation when sewing a tension cloth to the same side airbag, and is an end view in which the same side airbag is seen from its front end side.

The width dimension of the tension cloth 26 (the dimension from one long side edge portion to the other long side edge portion) is set shorter than the front and rear direction dimension of the side airbag 20 in a flatly spread-out state. Furthermore, the length dimension of the tension cloth 26 (the dimension from one short side edge portion to the other short side edge portion) is set shorter than the up and down direction dimension of the side airbag 20 in a flatly spread-out state. For this reason, when the tension cloth 26 is to be sewn to the side airbag 20, as shown in FIG. 4, part of the up and down direction middle portion of the side airbag 20 is folded up along a pair of fold lines L1 and L2 along the front and rear direction of the side airbag 20, the tension cloth 26 is laid on top of the folded-up side airbag 20, and the seams T3 and T4 are sewn.

The tension cloth 26 that has been sewn to the side airbag 20 is ordinarily folded up together with the side airbag 20 and housed inside the door-side side portion 14A, and when the side airbag 20 is supplied with the gas from the inflator 22 and is inflated and deployed, the tension cloth 26 is deployed toward the vehicle width direction outer side of the side airbag 20. As mentioned above, the length dimension of the tension cloth 26 is set shorter than the up and down direction dimension of the side airbag 20 in a flatly spread-out state, and the tension cloth 26 is disposed bridging the upper end portion of the upper side bag portion 34 and the lower end portion of the lower side bag portion 36. For this reason, when the side airbag 20 is inflated and deployed, the tension cloth 26 is pulled between the upper end portion of the upper side bag portion 34 and the lower end portion of the lower side bag portion 36. Because of this, inflation of the side airbag 20 in the direction in which the tension cloth 26 is pulled (the direction of arrows T in FIG. 5) is controlled. As a result, a vehicle width direction inflation width W of the side airbag 20 is enlarged.

Figure 5:
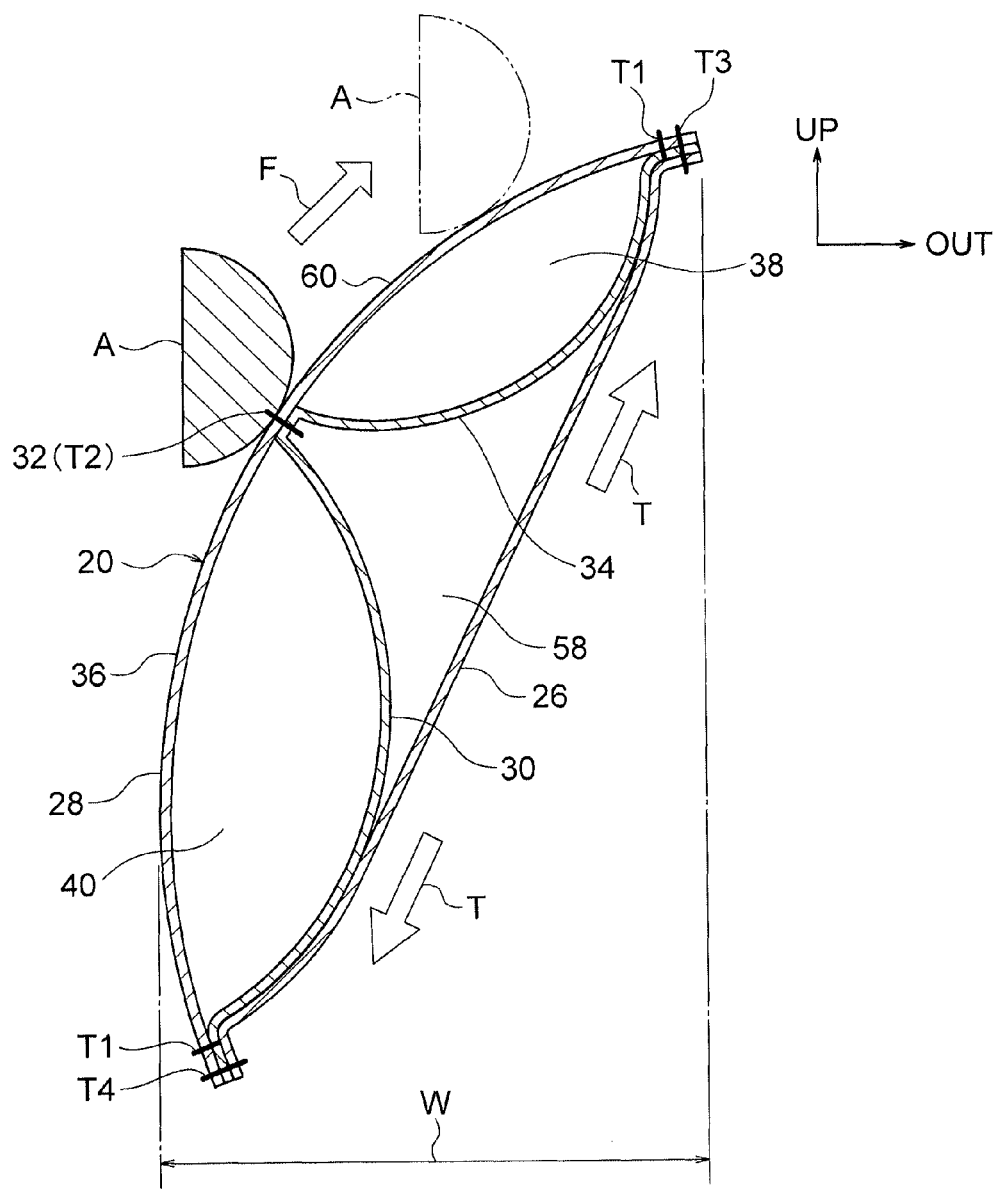
FIG. 5 is an enlarged cross-sectional view in which part of FIG. 2 is enlarged.

In other words, as shown in FIG. 2 and FIG. 5, the tension cloth 26 is pulled and becomes taut (stretches) so that the side airbag 20 can no longer be vertically inflated, and the side airbag 20 bends slightly along the partition portion 32 in such a way as to displace the partition portion 32 inward in the vehicle width direction. Because of this, the up and down direction middle portion of the side airbag 20 projects inward in the vehicle width direction, and a space 58 that is substantially triangular as seen in the vehicle front and rear direction is formed between the up and down direction middle portion of the side airbag 20 and the tension cloth 26.

When the inflated and deployed state of the side airbag 20 is seen from the direction in which the partition portion 32 extends (here, the front and rear direction of the seat back 14), the vehicle width direction inner side surface (the base cloth 28) of the side airbag 20 bows inward in the vehicle width direction and the tension cloth 26 becomes linearly stretched, so that a substantially D-shaped outer peripheral surface is formed by the base cloth 28 and the tension cloth 26. Additionally, the vehicle width direction inner side surface of the upper side bag portion 34 becomes an upper arm upward pushing surface 60 that curves in such a way as to rise as it heads outward in the vehicle width direction.

Furthermore, as shown in FIG. 1, when the inflated and deployed state of the side airbag 20 is seen from the outer side in the vehicle width direction, the tension cloth 26 extends in the substantially up and down direction on the vehicle width direction outer side of the side airbag 20, and the tension cloth 26 is disposed on the opposite side of the side airbag 20 via the shoulder S, the chest C, the abdomen B, and the lower back L of the occupant P.

Furthermore, in the present embodiment, as shown in FIG. 2, a door beltline 49 of the side door 46 is positioned in a position lower than the center of the shoulder S of the occupant P, and the partition portion 32 of the inflated and deployed side airbag 20 is disposed in a position lower than the door beltline 49. Additionally, the inflated and deployed upper side bag portion 34 projects further upward than the door beltline 49 and comes between the shoulder S of the occupant P and a door glass 50 of the side door 46. Additionally, the tension cloth 26 disposed bridging the upper end portion (the section on the upper side of the center of the shoulder S) of the upper side bag portion 34 and the lower end portion of the lower side bag portion 36 is deployed vertically straddling the door beltline 49 and comes between the side door 46 and the upper side bag portion 34 and lower side bag portion 36. The position of the center of the shoulder S is a position in the axial center of a bolt 62 disposed in the shoulder S of the dummy P seated in the vehicle seat 12.

(Action and Effects)

Next, the action and effects of the first embodiment will be described.

In the side airbag device 10 having the configuration described above, when the ECU 52 detects a side impact to or a rollover of the vehicle on the basis of the signal from the side impact sensor 54 or the rollover sensor 56, the inflator 22 is activated by the ECU 52. Then, the gas discharged from the inflator 22 is supplied to the inner side of the side airbag 20, and the side airbag 20 is inflated and deployed between the occupant P and the side door 46. Because of this, the shoulder S, the chest C, the abdomen B, and the lower back L of the occupant P are restrained by the side airbag 20.

Here, in the inflated and deployed state, the upper side bag portion 34 and the lower side bag portion 36 of the side airbag 20 are vertically adjacent to one another, and the tension cloth 26 disposed bridging the upper side bag portion 34 and the lower side bag portion 36 on the vehicle width direction outer side of the side airbag 20 is pulled between the upper side bag portion 34 and the lower side bag portion 36. As a result, inflation of the side airbag 20 in the direction in which the tension cloth 26 is pulled is controlled, and the vehicle width direction inflation width W of the side airbag 20 is enlarged. Because of this, the vehicle width direction shock absorbing stroke can be ensured by the small-capacity side airbag 20. In other words, the capacity of the side airbag 20 can be reduced without having to reduce the shock absorbing stroke, so it becomes possible to inflate and deploy the side airbag 20 at an early stage without having to increase the output of the inflator 22.

Moreover, because the vehicle width direction inflation width W of the side airbag 20 is enlarged as described above, even in a case where the space between the shoulder S of the occupant P and the door glass 50 of the side door 46 is wide, it becomes possible to apply, at an early stage, the reaction force from the side door 46 to the upper side bag portion 34 that has been inflated and deployed in that space. As a result, the ability of the side airbag 20 to initially restrain the shoulder S can be improved, so the load on the chest C can be reduced and the ability of the side airbag 20 to restrain the occupant can be improved.

Furthermore, in the present embodiment, the tension cloth 26 is positioned on the vehicle width direction outer side of the inflated and deployed side airbag 20, so even in a case where the vehicle has rolled over, for example, the tension cloth 26 can protect the side airbag 20 from fragments of the door glass 50 of the side door 46.

Moreover, in the present embodiment, when the side airbag 20 is inflated and deployed, the tension cloth 26 positioned on the vehicle width direction outer side of the side airbag 20 is deployed vertically straddling the door beltline 49 of the side door 46. Additionally, the tension cloth 26 is pulled between the upper end portion of the upper side bag portion 34, which is positioned on the upper side of the center 62 of the shoulder S, and the lower side bag portion 36. As a result, the tension cloth 26 functions as a reaction force surface that supports, from the outer side in the vehicle width direction, the upper side bag portion 34 that restrains the shoulder S. Because of this, even in a case where the reaction force from the door trim 48 of the side door 46 cannot be allowed to directly act on the section of the upper side bag portion 34 positioned on the upper side of the door beltline 49, the upper side bag portion 34 can be excellently supported from the outer side in the vehicle width direction by the reaction force from the tension cloth 26. As a result, even in a vehicle in which the door beltline 49 is set in a position lower than the center of the shoulder S, the ability of the upper side bag portion 34 to initially restrain the shoulder S can be effectively improved.

Moreover, because the tension cloth 26 is positioned on the vehicle width direction outer side of the side airbag 20, the side airbag 20 is inflated and deployed in such a way that the up and down direction middle portion of the side airbag 20 projects inward in the vehicle width direction while the side airbag 20 bends slightly along the partition portion 32 in such a way that the partition portion 32 is displaced inward in the vehicle width direction. Because of this, the vehicle width direction inner side surface of the upper side bag portion 34 becomes the upper arm upward pushing surface 60 that curves in such a way as to rise as it heads outward in the vehicle width direction. For this reason, the side airbag 20 and the occupant P relatively move closer to one another because of the shock of the side impact, so that the upper arm upward pushing surface 60 and the upper arm A of the occupant P come into sliding contact with one another and a force F that pushes the upper arm A upward arises. As a result, the upper arm A is pushed upward (slides upward) and is restrained by the upper side bag portion 34. Because of this, the upper arm A can be kept from coming between the chest C of the occupant P and the side airbag 20, so the load on the chest C can be effectively reduced.

Furthermore, in the present embodiment, the tension cloth 26 is sewn to the side airbag 20 at the seams T3 and T4 that are set on the outer periphery outer side of the outer peripheral seam T1 of the side airbag 20, so gas leakage from the seams T3 and T4 can be prevented. In other words, a measure (such as adding a reinforcement cloth) for preventing gas leakage from the seams between the tension cloth 26 and the side airbag 20 becomes unnecessary, which is preferred.

Moreover, in the present embodiment, the tension cloth 26 is configured by a cloth material that is more difficult to stretch than the base cloths 28 and 30, so inflation of the side airbag 20 in the direction in which the tension cloth 26 is pulled can be excellently controlled, and the vehicle width direction inflation width of the side airbag 20 can be excellently enlarged.

(Supplemental Description of First Embodiment)

Figure 6:
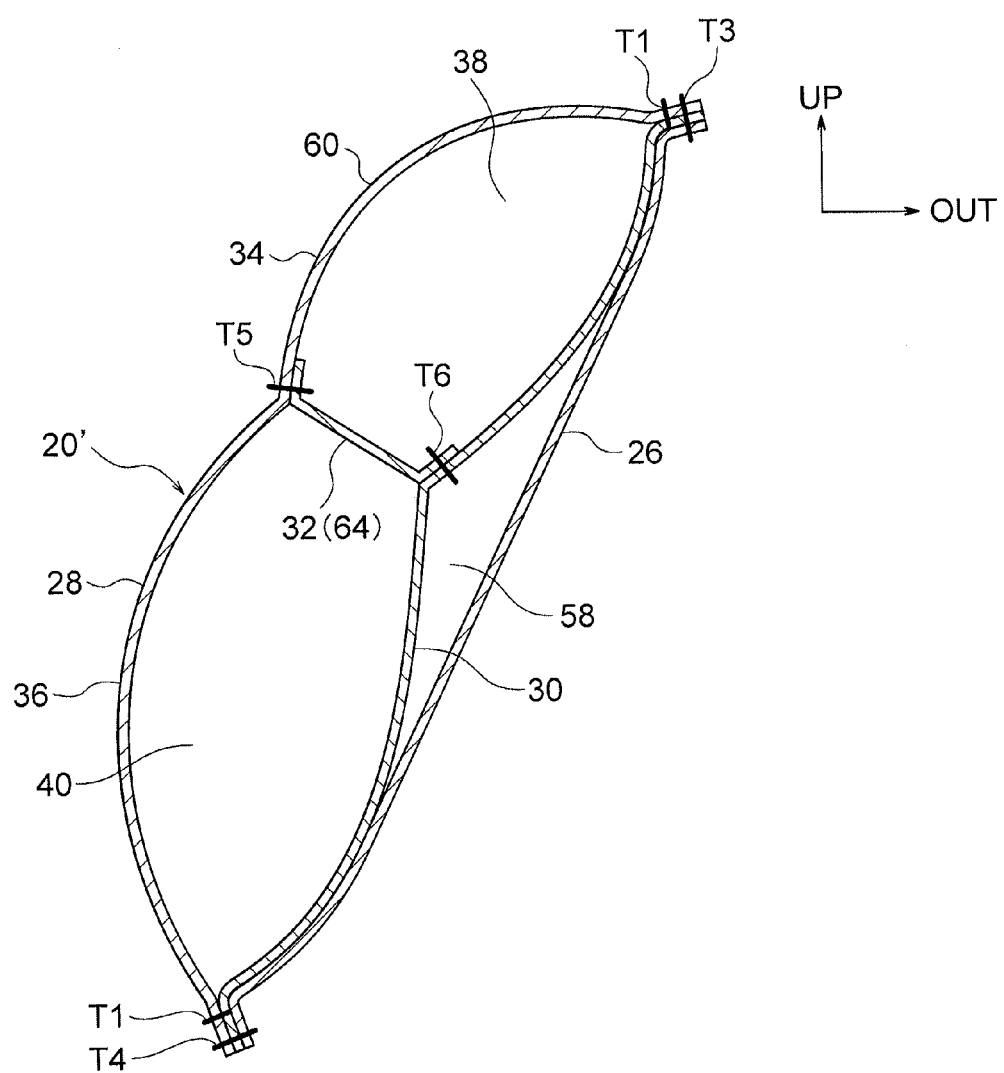
FIG. 6 is a cross-sectional view corresponding to FIG. 5 showing a first example modification of the first embodiment of the present invention.

In the first embodiment, a case was described where the partition portion 32 of the side airbag 20 is configured by the seam T2, but the present invention is not limited to this, and like in a side airbag 20' in a first example modification shown in FIG. 6, the partition portion 32 may also be formed by a partition cloth (a tether) 64. The partition cloth 64 is sewn to the base cloths 28 and 30 at seams T5 and T6. Furthermore, the partition cloth 64 may also be formed integrally with one of the base cloths 28 and 30. In this way, because the partition portion 32 is formed by the partition cloth 64, the inflation width of the side airbag 20' can be excellently enlarged.

Figure 7:
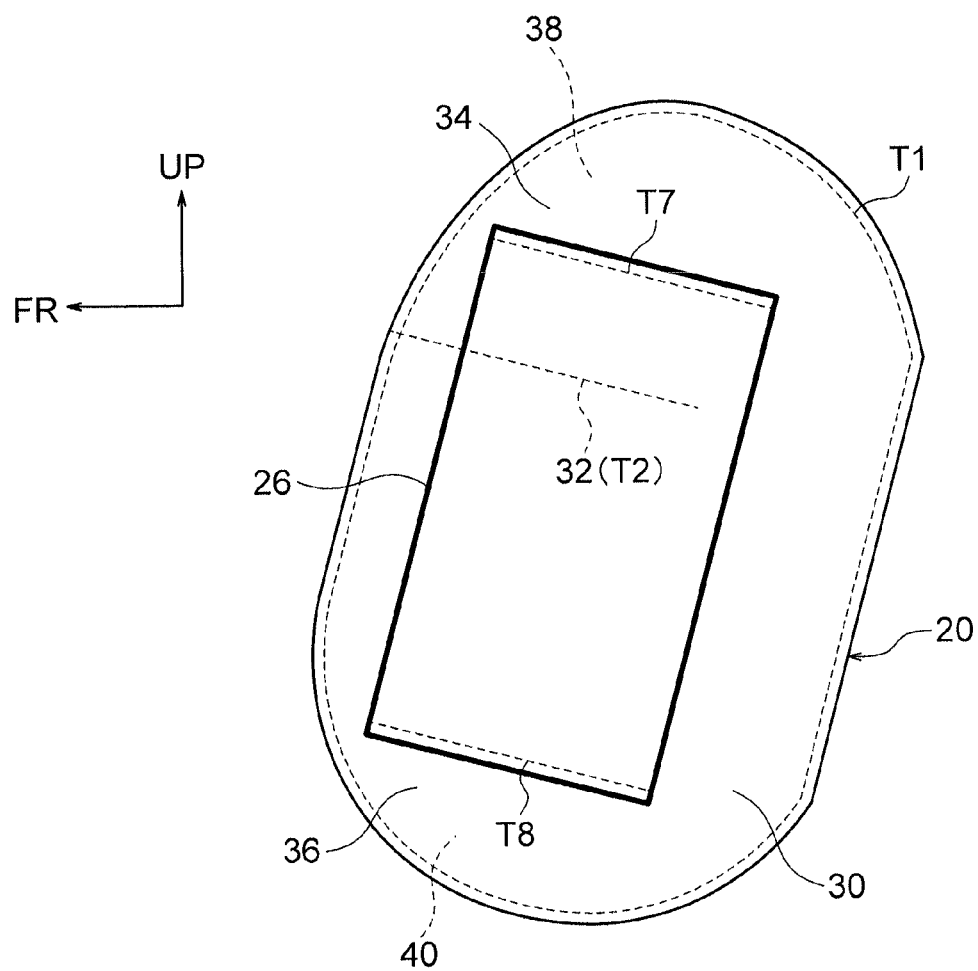
FIG. 7 is a side view showing the inflated and deployed state of the side airbag in a second example modification of the first embodiment of the present invention.
Figure 8:
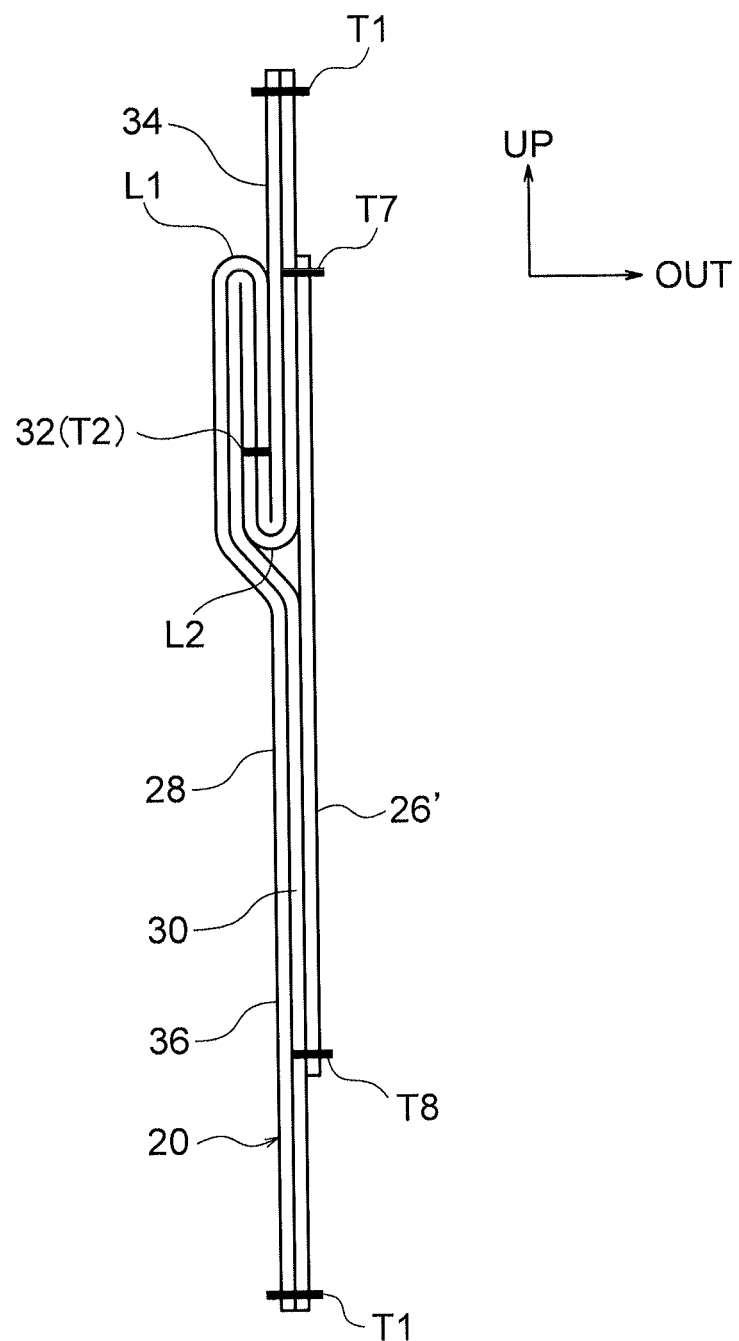
FIG. 8 is a drawing for describing a situation when sewing a tension cloth to the same side airbag, and is an end view in which the same side airbag is seen from its front end side.

Furthermore, in the first embodiment, the tension cloth 26 is sewn to the outer peripheral portion of the side airbag 20, but the present invention is not limited to this, and like in a second example modification shown in FIG. 7 and FIG. 8, a tension cloth 26' may also be sewn to the up and down direction middle portion of the upper side bag portion 34 at a seam T7 and sewn to the up and down direction middle portion of the lower side bag portion 36 at a seam T8. In this second example modification, the length dimension of the tension cloth 26' is set shorter than the length dimension of the tension cloth 26 in the first embodiment, so weight and costs can be reduced. The tension cloth 26' needs to be sewn to the base cloth 30 before the base cloth 28 and the base cloth 30 are sewn to one another at the outer peripheral seam T1.

Moreover, in the first embodiment, the side airbag 20 and the tension cloth 26 are seen as separate constituent elements, but the tension cloth 26 may also be seen as part of the side airbag 20. In other words, it is also possible to see the side airbag 20 pertaining to the first embodiment as an airbag bag body and to see the airbag bag body having the tension cloth 26 sewn to it as a side airbag.

The above supplemental description also holds true for the other embodiments of the present invention described below. In the following embodiments, regarding configurations and action that are basically the same as those of the first embodiment, the same reference signs as those in the first embodiment will be assigned thereto and description thereof will be omitted. Furthermore, unless otherwise specified, the front, rear, up, and down directions of side airbags 70, 80, and 90 appearing in the following embodiments indicate directions in a state in which the side airbags 70, 80, and 90 are inflated and deployed and substantially coincide with the front, rear, up, and down directions of the seat back 14.

Second Embodiment

Figure 9:
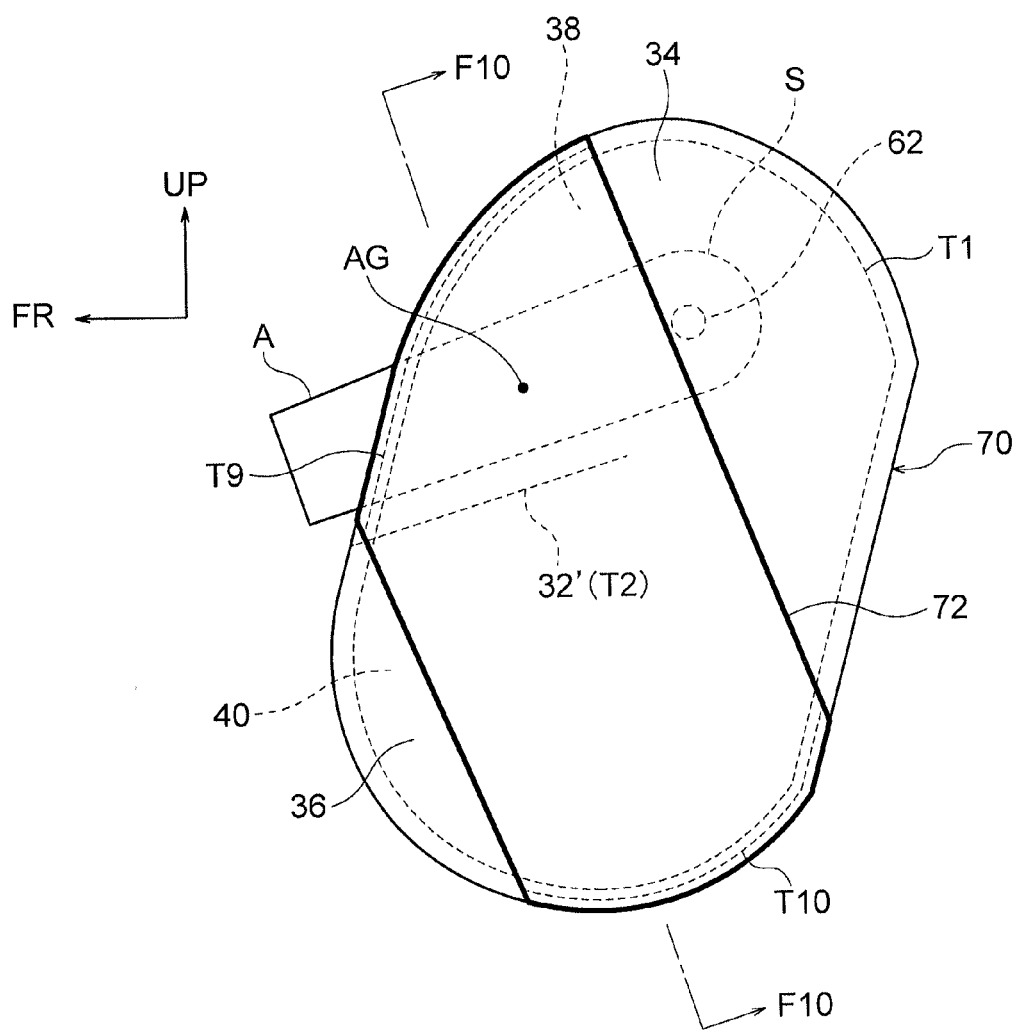
FIG. 9 is a side view showing an inflated and deployed state of a side airbag in a second embodiment of the present invention.
Figure 10:
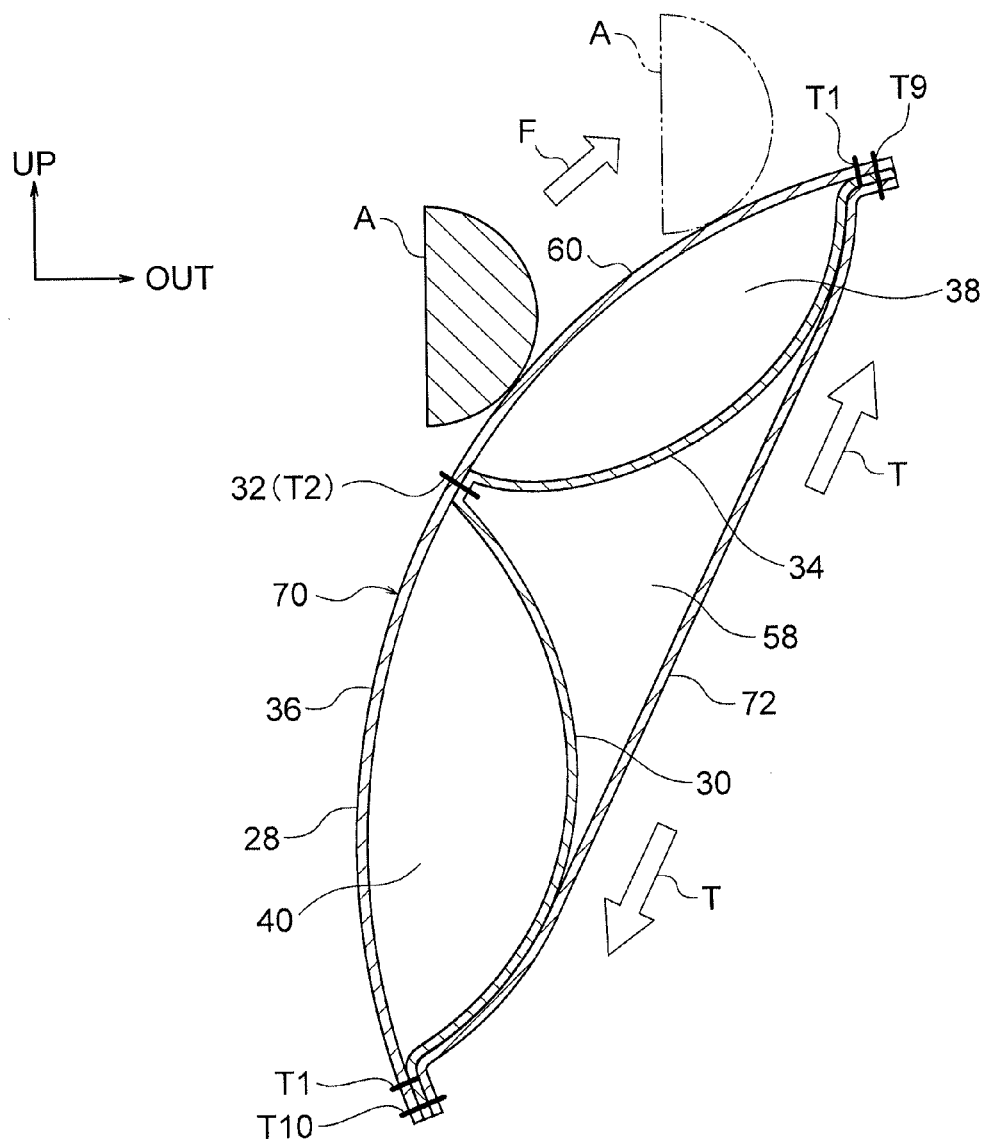
FIG. 10 is a cross-sectional view showing a cross section along line F10-F10 of FIG. 9.

In FIG. 9, the inflated and deployed state of a side airbag 70 that is a constituent member of a side airbag device pertaining to a second embodiment of the present invention is shown in a side view seen from the outer side in the vehicle width direction. Furthermore, in FIG. 10, there is shown a cross-sectional view showing a cross section along line F10-F10 of FIG. 9. In this side airbag 70, the setting direction of a partition portion 32' differs from the first embodiment. The partition portion 32' is, like the partition portion 32 pertaining to the first embodiment, configured by the seam T2, but is set in such a way as to extend obliquely downward in the vehicle front direction along the upper arm A of the occupant P on the lower side of the upper arm A in the inflated and deployed state of the side airbag 70.

Furthermore, in this embodiment, the configuration of a tension cloth 72 is different from that of the tension cloth 26 pertaining to the first embodiment. The tension cloth 72 is formed in a long shape by the same cloth material as that of the tension cloth 26 and is disposed on the opposite side of the base cloth 28 via the base cloth 30 in a state in which the lengthwise direction of the tension cloth 72 is orthogonal or substantially orthogonal to the extension direction of the partition portion 32' and in which the tension cloth 72 straddles the partition portion 32'.

One lengthwise direction end portion of the tension cloth 72 is sewn to the side airbag 70 from the upper portion to the up and down direction middle portion of the front end edge portion of the side airbag 70 at a seam T9. Furthermore, the other lengthwise direction end portion of the tension cloth 72 is sewn to the side airbag 70 from the rear portion side of the lower end edge portion of the side airbag 70 to the lower portion side of the rear end edge portion of the side airbag 70 at a seam T10. Because of this, the tension cloth 72 is disposed bridging the upper end portion of the upper side bag portion 34 and the lower end portion of the lower side bag portion 36, so that the front end portion of the upper side bag portion 34 and the rear portion side of the lower end portion of the lower side bag portion 36 are coupled to one another by the tension cloth 72.

The length dimension of the tension cloth 72 (the dimension from one short side edge portion to the other short side edge portion) is set shorter than the distance (length dimension) between the front end portion of the upper side bag portion 34 to the rear portion side of the lower end portion of the lower side bag portion 36 in a flatly spread-out state of the side airbag 70. For this reason, in a state in which the side airbag 70 is inflated and deployed, the tension cloth 72 is pulled between the front end portion of the upper side bag portion 34 and the rear portion side of the lower end portion of the lower side bag portion 36. Because of this, inflation of the side airbag 70 in the direction in which the tension cloth 76 is pulled (the direction of arrows T in FIG. 10) is controlled. As a result, the vehicle width direction inflation width of the side airbag 70 is enlarged. In this embodiment, configurations other than those described above are the same as those in the first embodiment.

In this embodiment also, basically the same action and effects as those of the first embodiment are achieved. Moreover, in this embodiment, in the inflated and deployed state of the side airbag 70, the partition portion 32' extends obliquely downward in the vehicle front direction along the upper arm A of the occupant P on the lower side of the upper arm A, so the vehicle width direction inner side surface (the upper arm upward pushing surface 60) of the upper side bag portion 34 and the lengthwise direction center portion of the upper arm A of the occupant P (near a center of gravity AG of the upper arm) can be excellently brought into contact with one another. Because of this, an upward pushing force F that acts on the upper arm A because of the sliding contact with the upper arm upward pushing surface 60 can be excellently allowed to act near the center of gravity AG of the upper arm A. As a result, it becomes possible to effectively push up the upper arm A.

Third Embodiment

Figure 11:
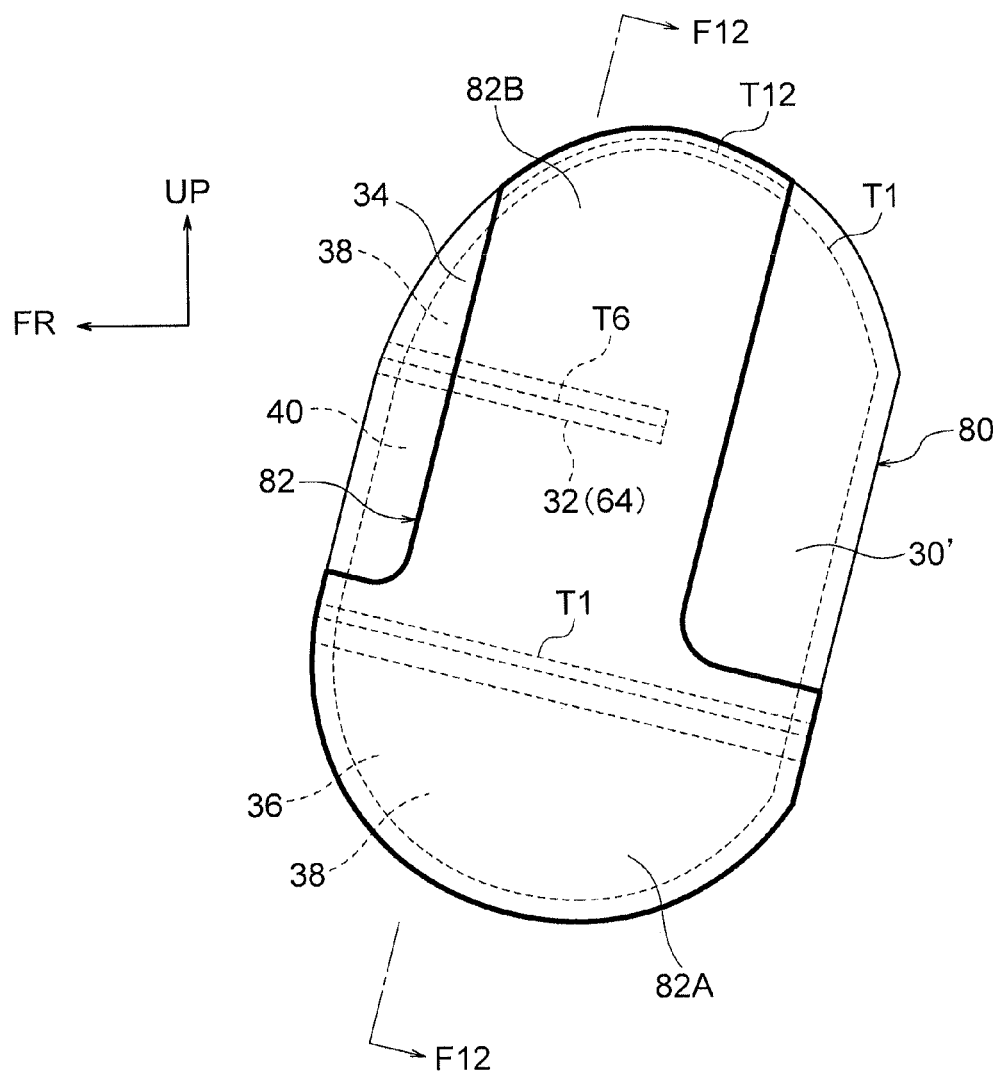
FIG. 11 is a side view showing an inflated and deployed state of a side airbag in a third embodiment of the present invention.
Figure 12:
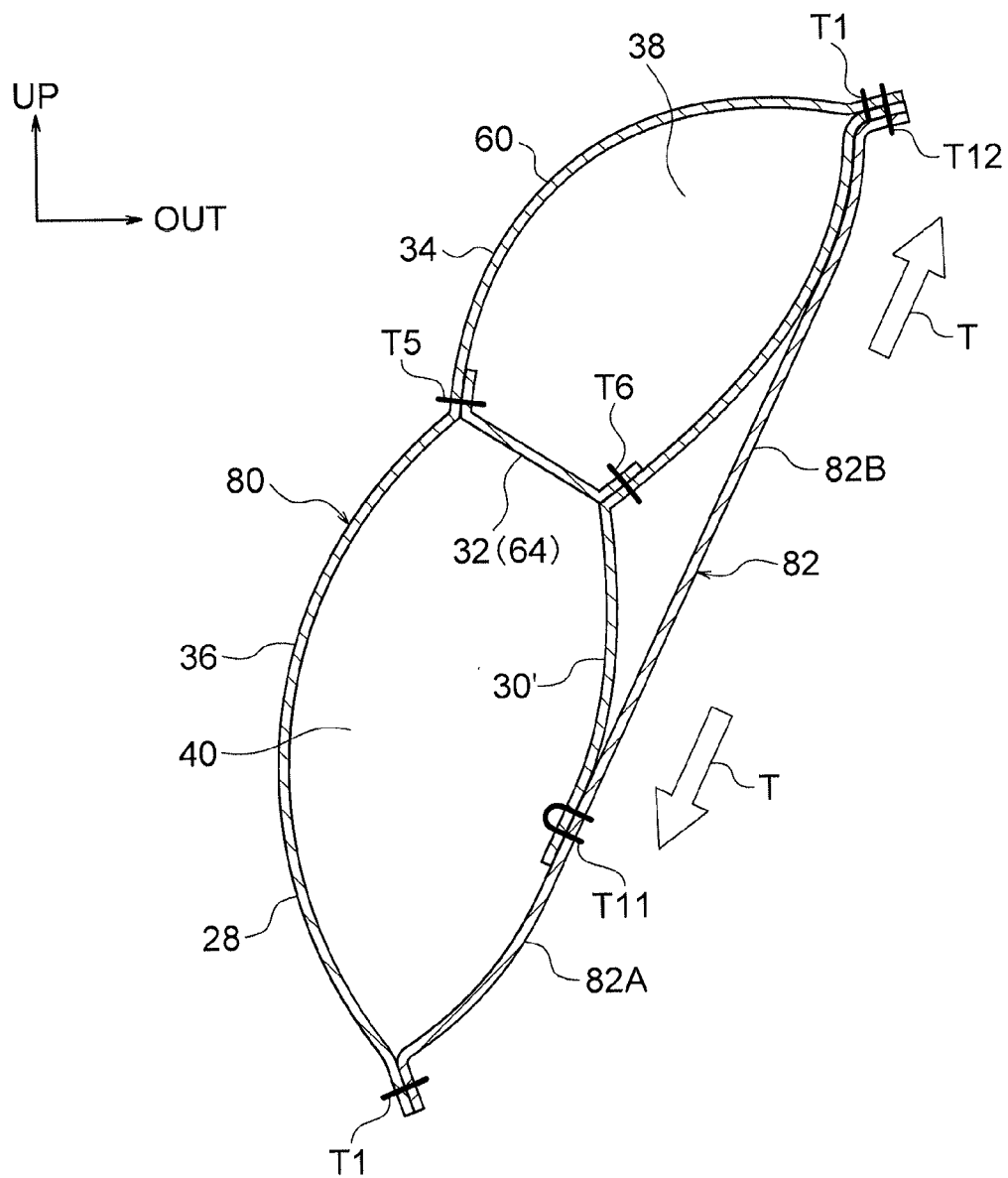
FIG. 12 is a cross-sectional view showing a cross section along line F12-F12 of FIG. 11.

In FIG. 11, the inflated and deployed state of a side airbag 80 that is a constituent member of a side airbag device pertaining to a third embodiment of the present invention is shown in a side view seen from the outer side in the vehicle width direction. Furthermore, in FIG. 12, there is shown a cross-sectional view showing a cross section along line F12-F12 of FIG. 11. In this side airbag 80, the partition portion 32 is, like in the first example modification of the first embodiment, configured by the partition cloth 64. Furthermore, in this side airbag 80, the up and down direction length dimension of a base cloth 30' is set shorter than the up and down direction length dimension of the base cloth 30 pertaining to the first embodiment, so that the lower portion of the base cloth 28 projects further downward than the lower end of the base cloth 30'.

Moreover, in this embodiment, a tension cloth 82 is configured by a bag configuring portion 82A that configures part of the lower side bag portion 36 and a tension applying portion 82B that extends upward from the bag configuring portion 82A, and the tension cloth 82 is formed in a substantially upside-down T shape. The upper end portion of the bag configuring portion 82A is sewn to the lower end portion of the base cloth 30' at a seam T11, and both front and rear end portions and the lower end portion of the bag configuring portion 82A are sewn to the lower portion of the base cloth 28 at the outer peripheral seam T1. Furthermore, the upper end portion of the tension applying portion 82B is sewn to the upper end portion of the side airbag 80 at a seam T12. The up and down direction length dimension of this tension applying portion 82B is set shorter than the length dimension of the side airbag 80 from the upper end portion of the side airbag 80 to the seam T11, so that when the upper end portion of the tension applying portion 82B is to be sewn to the upper end portion of the side airbag 80 at the seam T12, the part of the side airbag 80 from the upper end portion of the side airbag 80 to the seam T11 is folded up along at least one pair of fold lines along the front and rear direction of the side airbag 80. In this embodiment, configurations other than those described above are the same as those in the first embodiment.

In this embodiment, when the side airbag 80 is inflated and deployed, the tension applying portion 82B of the tension cloth 82 is pulled between the seams T11 and T12, so that up and down direction inflation of the side airbag 80 is controlled. As a result, the side airbag 80 is inflated and deployed in such a way that the up and down direction middle portion of the side airbag 80 projects inward in the vehicle width direction while the side airbag 80 bends slightly along the partition portion 32 in such a way that the partition portion 32 is displaced inward in the vehicle width direction. Because of this, basically the same action and effects as those of the first embodiment are achieved.

Moreover, part of the lower side bag portion 36 of the side airbag 80 is configured by part (the bag configuring portion 82A) of the tension cloth 82, so the quantity of the base cloths configuring the side airbag 80 can be reduced (the size of the base cloth 30' can be reduced). As a result, weight and costs can be reduced. Furthermore, by appropriately setting and changing the up and down direction position of the seam T11 in the inflated and deployed state of the side airbag 80, the bending degree of the side airbag 80 along the partition portion 32 can be arbitrarily adjusted.

Fourth Embodiment

Reference Example

Figure 13:
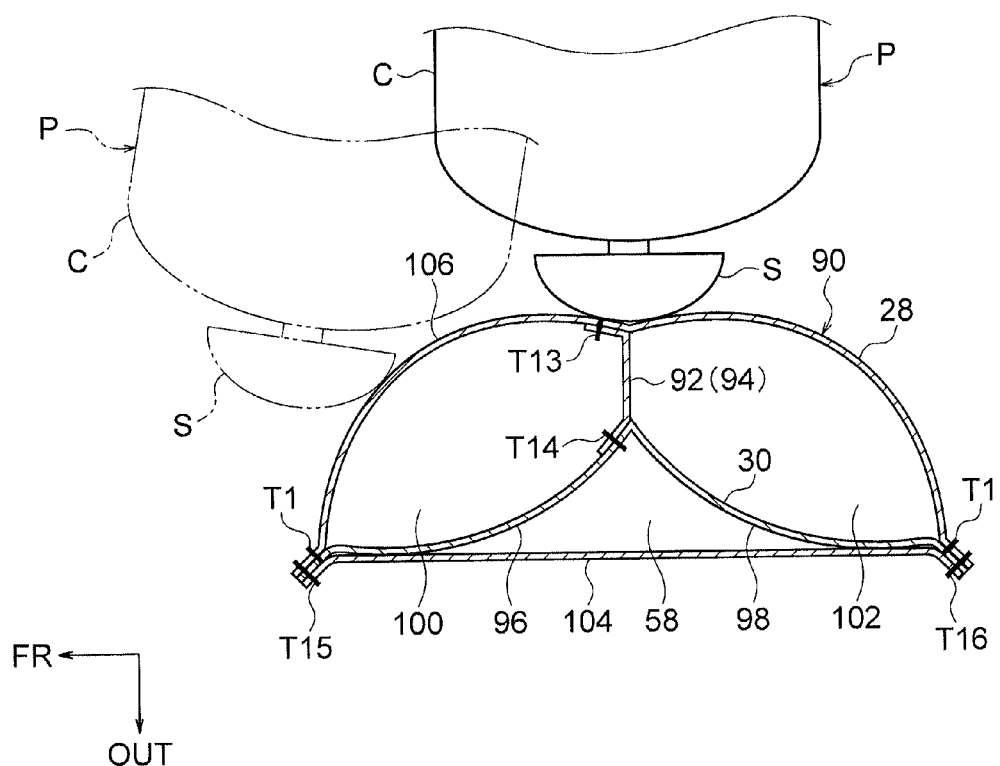
FIG. 13 is a plan cross-sectional view showing an inflated and deployed state of a side airbag in a fourth embodiment of the present invention.

In FIG. 13, the inflated and deployed state of a side airbag 90 that is a constituent member of a side airbag device pertaining to a fourth embodiment of the present invention is shown in a plan cross-sectional view. The side airbag 90 is, like the side airbag 20 pertaining to the first embodiment, formed in a bag shape as a result of the base cloths 28 and 30 being sewn to one another at the outer peripheral seam T1. Inside the side airbag 90, there is disposed a partition portion 92 that extends in the height direction of the seat back 14 in the inflated and deployed state of the side airbag 90. In the present embodiment, the partition portion 92 is configured by a partition cloth 94 (a tether). The partition cloth 94 is formed in a long shape, with one long side edge portion of the partition cloth 94 being sewn to the base cloth 28 at a seam T13 and with the other long side edge portion of the partition cloth 94 being sewn to the base cloth 30 at a seam T14. Because of the partition portion 92, the side airbag 90 is partitioned into a bag portion 96 on the front side (hereinafter called "the front side bag portion 96") and a bag portion 98 on the rear side (hereinafter called "the rear side bag portion 98"). The partition portion 92 may also be configured by a seam.

The inner side of the front side bag portion 96 is a front side chamber 100, and the inner side of the rear side bag portion 98 is a rear side chamber 102. The front side chamber 100 and the rear side chamber 102 are communicated with one another via a communicating opening not shown in the drawings that is disposed in the partition portion 92, and the gas from the inflator 22 (not shown in FIG. 13) disposed in the rear side chamber 102 is supplied to the front side chamber 100 via the communicating opening. Because of that, the side airbag 90 is inflated and deployed between the occupant P and the side door 46 (not shown in FIG. 13) in a state in which the internal pressure of the rear side bag portion 98 is higher than the internal pressure of the front side bag portion 96. The side airbag 90 is, like the side airbag 20 pertaining to the first embodiment, formed in a size capable of restraining the shoulder S, the chest C, the abdomen B, and the lower back L of the occupant P.

A tension cloth 104 is attached to the side airbag 90. The tension cloth 104 is formed in a long shape by the same cloth material as that of the tension cloth 26 pertaining to the first embodiment and is disposed on the opposite side of the base cloth 28 via the base cloth 30 in a state in which the lengthwise direction of the tension cloth 104 is orthogonal or substantially orthogonal to the extension direction of the partition portion 92 and in which the tension cloth 104 straddles the partition portion 92. In other words, the tension cloth 104 is disposed in such a way as to be positioned on the vehicle width direction outer side of the side airbag 90 in the inflated and deployed state of the side airbag 90.

One lengthwise direction end portion of the tension cloth 104 is sewn to the front end portion of the front side bag portion 96 at a seam T15, and the other lengthwise direction end portion of the tension cloth 104 is sewn to the rear end portion of the rear side bag portion 98 at a seam T16. Because of this, the tension cloth 104 is disposed bridging the front end portion of the front side bag portion 96 and the rear end portion of the rear side bag portion 98, so that the front end portion of the front side bag portion 96 and the rear end portion of the rear side bag portion 98 are coupled to one another by the tension cloth 104. The length dimension of the tension cloth 26 is set shorter than the front and rear direction length dimension of the side airbag 90 in a flatly spread-out state.

In this embodiment, when the side airbag 90 is inflated and deployed, the tension cloth 104 is pulled between the front end portion of the front side bag portion 96 and the rear end portion of the rear side bag portion 98. Because of this, inflation of the side airbag 90 in the direction in which the tension cloth 104 is pulled (here, the vehicle front and rear direction) is controlled, and the vehicle width direction inflation width of the side airbag 90 is enlarged. Because of this, the ability of the side airbag 90 to initially restrain the shoulder S can be improved.

Moreover, in this embodiment, when the side airbag 90 is inflated and deployed, the partition portion 92 extends up and down along the front and rear direction center portion (the front and rear direction center and near the front and rear direction center) of the side surface of the chest C of the occupant P, and the front side bag portion 96 and the rear side bag portion 98 are adjacent to one another in the vehicle front and rear direction. Additionally, as shown in FIG. 13, the side airbag 90 whose inflation in the vehicle front and rear direction is controlled as described above is inflated and deployed in such a way that the front and rear direction center portion of the side airbag 90 projects inward in the vehicle width direction while the side airbag 90 bends slightly along the partition portion 92 in such a way that the partition portion 92 is displaced inward in the vehicle width direction. As a result, the vehicle width direction inner side surface of the front side bag portion 96 becomes a curved surface 106 that curves in such a way as to head outward in the vehicle width direction as it heads toward the vehicle front side.

For this reason, the curved surface 106 and the side surface of the chest C of the occupant P come into sliding contact with one another because of the shock of the side impact, so that the upper body of the occupant P can be displaced toward the vehicle front side. In this case, the upper body of the occupant P rotates about a vertical axis in such a way as to face slightly inward in the vehicle width direction, and the rear half of the chest portion C whose load resistance is relatively high is restrained by the front side bag portion 96. Because of this, it can be ensured that the front half of the chest C whose load resistance is relatively low does not receive the load from the side airbag 90, and during the latter half of restraint also, the rear half of the chest C whose load resistance is relatively high can continue to be restrained.

In the fourth embodiment, one lengthwise direction end portion of the tension cloth 104 is sewn to the front end portion of the front side bag portion 96, and the other lengthwise direction end portion of the tension cloth 104 is sewn to the rear end portion of the rear side bag portion 98, but the present invention is not limited to this. For example, the one lengthwise direction end portion of the tension cloth 104 may also be sewn to the front and rear direction middle portion of the front side bag portion 96, and the other lengthwise direction end portion of the tension cloth 104 may also be sewn to the front and rear direction middle portion of the rear side bag portion 98. Furthermore, for example, part of the rear side bag portion 98 may also be configured by the tension cloth 104 like in the third embodiment.

The present invention has been described above by way of several embodiments, but the present invention can be changed in a variety of ways and implemented without departing from the spirit thereof. Furthermore, it goes without saying that the scope of rights of the present invention is not limited to the embodiments described above.

The invention claimed is:

1. A vehicle side airbag device comprising:
    an inflator disposed in a seat back of a vehicle seat and that generates a gas upon activation;
    a side airbag that has two bag portions partitioned from one another by a partition portion, the side airbag being inflated and deployed, when the gas is supplied to an inner side of the side airbag, toward a vehicle front side from a side portion of a vehicle width direction outer side of the seat back of the vehicle seat, the two bag portions being adjacent to one another along a vehicle body side portion, and the side airbag configured to restrain at least a shoulder, a chest and an abdomen of an occupant seated in the vehicle seat; and
    a tension cloth that is disposed bridging the two bag portions on a vehicle width direction outer side of the side airbag in an inflated and deployed state of the side airbag, that is pulled between the two bag portions, and that controls inflation of the side airbag in the direction in which the tension cloth is pulled to enlarge a vehicle width direction inflation width of the side airbag,
    wherein in the inflated and deployed state of the side airbag, the two bag portions are vertically adjacent to one another, and the tension cloth is pulled between an upper side of a first one of the two bag portions disposed on an upper side and a second one of the two bag portions disposed on a lower side.

2. The vehicle side airbag device according to claim 1, wherein in the inflated and deployed state of the side airbag, the tension cloth is deployed vertically straddling a door beltline of a side door disposed in the vehicle body side portion.

3. The vehicle side airbag device according to claim 1, wherein:
    the vehicle seat is a driver's seat, and
    the partition portion is set in such a way as to extend obliquely downward in a vehicle front direction.

4. The vehicle side airbag device according to claim 1, wherein the tension cloth is formed from a cloth material separate from base cloths configuring the side airbag and is sewn to the side airbag on a side airbag outer periphery outer side of an outer peripheral seam disposed in an outer peripheral portion of the side airbag.

5. The vehicle side airbag device according to claim 4, wherein the tension cloth is configured by a cloth material that is more difficult to stretch than base cloths configuring the side airbag.

6. The vehicle side airbag device according to claim 1, wherein part of the side airbag is configured by part of the tension cloth.

7. The vehicle side airbag device according to claim 6, wherein the tension cloth is configured by a cloth material that is more difficult to stretch than the base cloths configuring the side airbag.

* * * * *